May 9, 1967 A. S. NICHOLAS 3,318,634
SEAT BELT UNIT

Filed April 16, 1965 4 Sheets-Sheet 1

INVENTOR.
ARTHUR S. NICHOLAS
BY
ATTORNEYS

May 9, 1967 A. S. NICHOLAS 3,318,634
SEAT BELT UNIT
Filed April 16, 1965 4 Sheets-Sheet 2
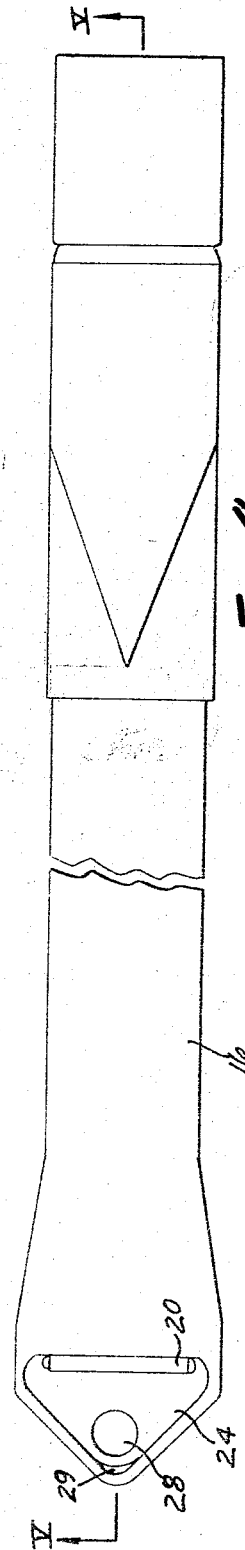
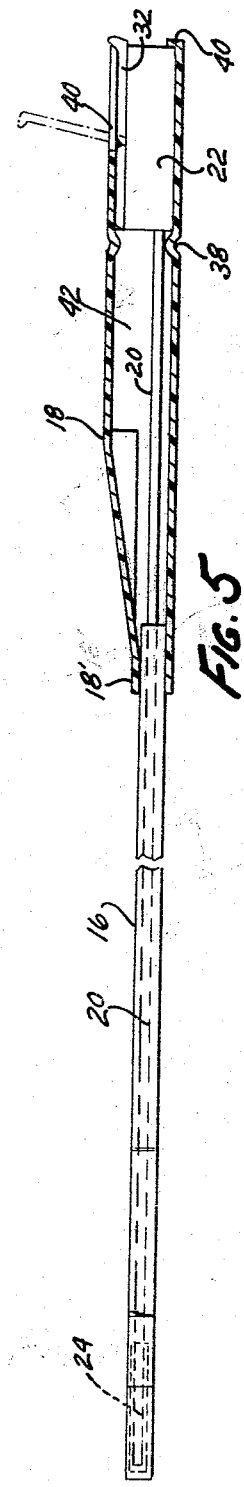
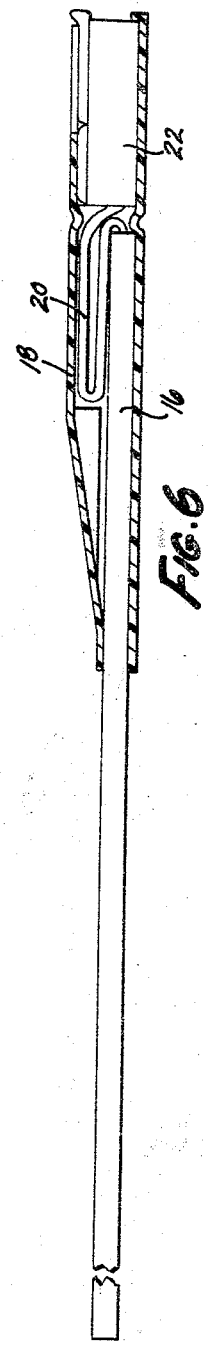
INVENTOR.
ARTHUR S. NICHOLAS
BY
ATTORNEYS

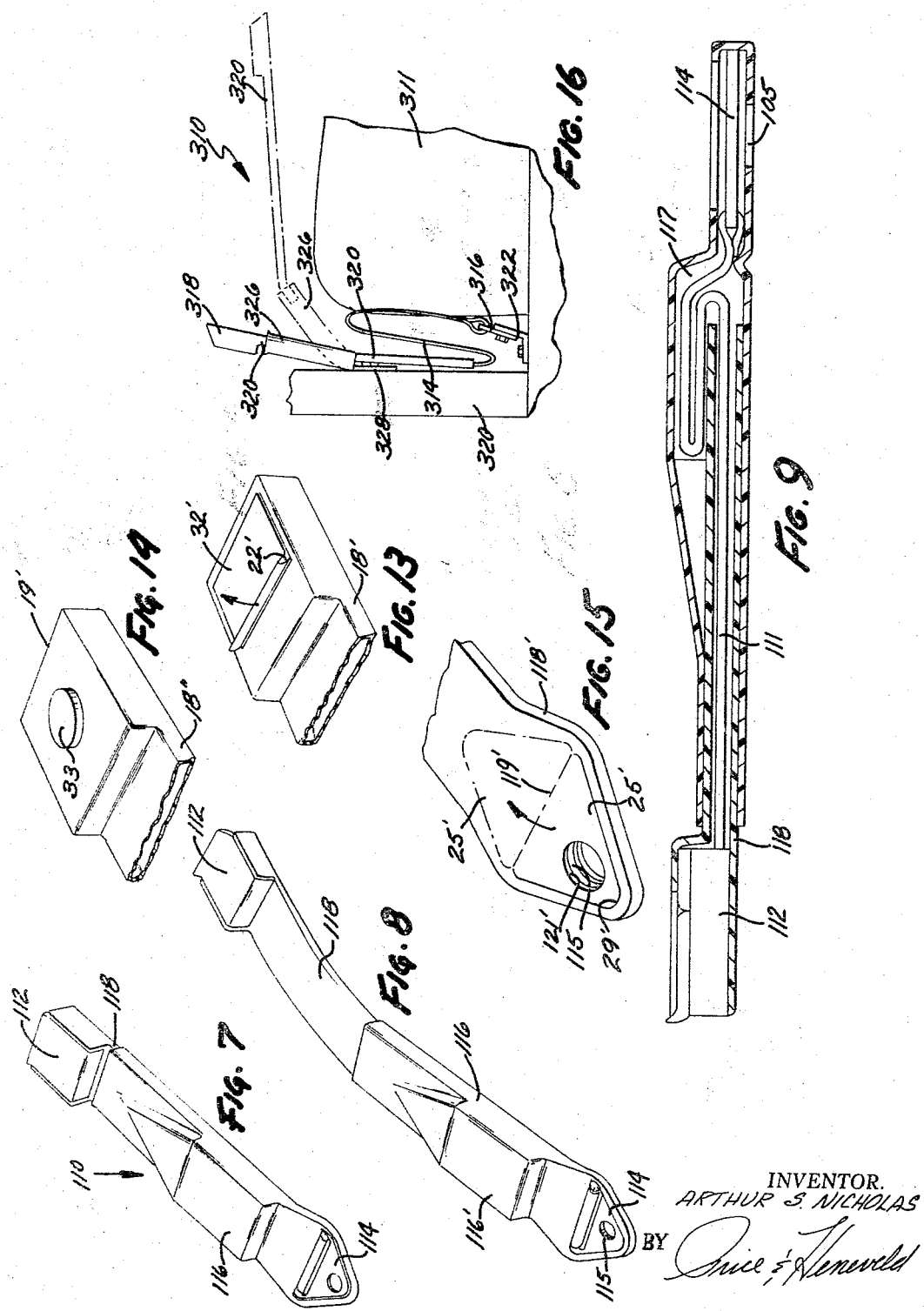

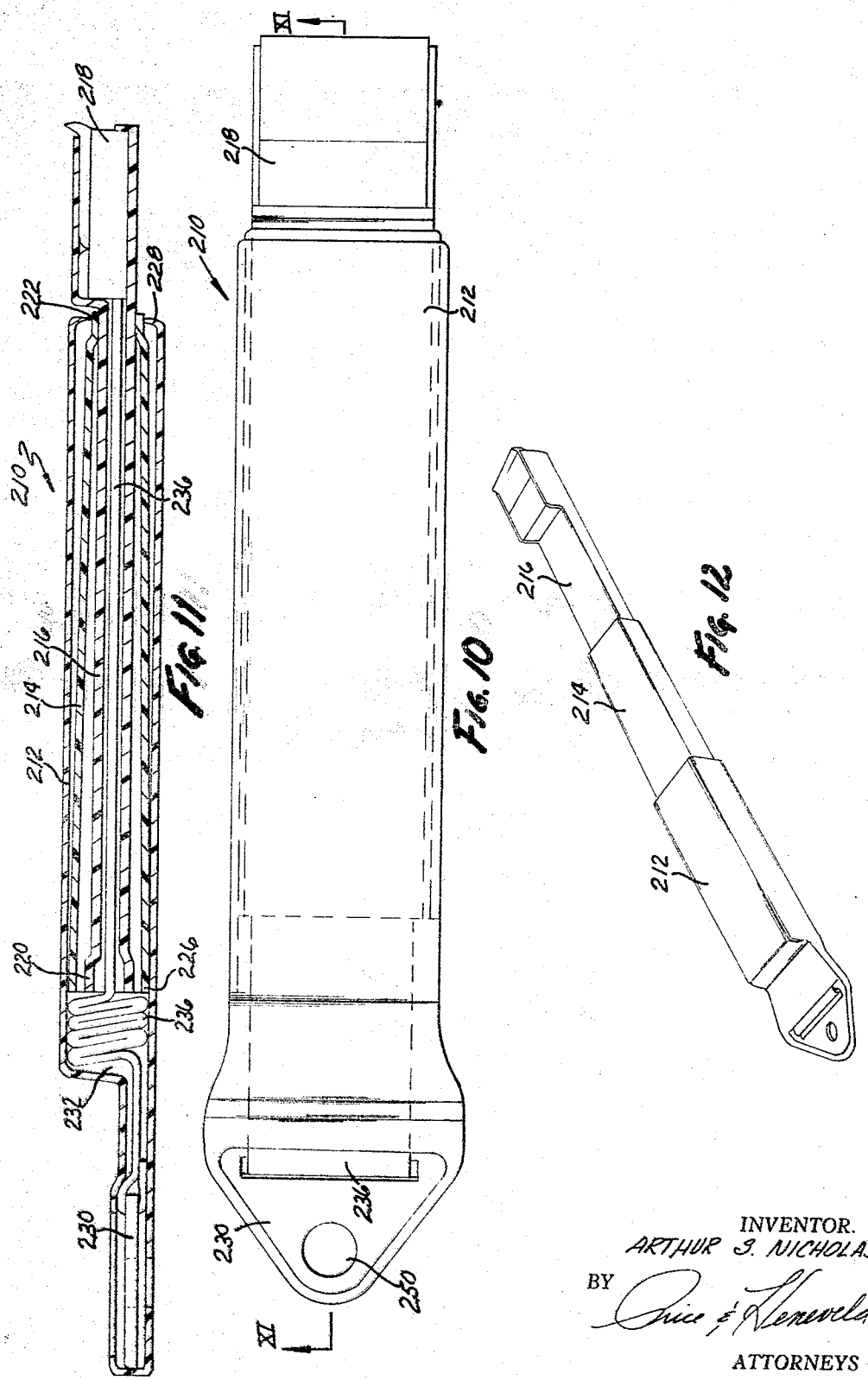

United States Patent Office 3,318,634
Patented May 9, 1967

3,318,634
SEAT BELT UNIT
Arthur S. Nicholas, Grand Rapids, Mich., assignor to Leon Chemical and Plastics Incorporated, Grand Rapids, Mich., a corporation of Michigan
Filed Apr. 16, 1965, Ser. No. 448,612
17 Claims. (Cl. 297—388)

This invention relates to vehicular seat belt assemblies, and more particularly to a seat belt retention and support device.

Of the two interlockable vehicular seat belt portions for each belt, one preferably is retractable by the use of a belt retractor such as a wind-up device. Safety regulations presently allow only one belt potrion to be so retracted, to prevent a person from inadvertently not extending the two belt portions the full extent prior to inerlocking them. Normally, the belt portion containing the simple, flat connector plate is the retractable one, since the other portion that mounts he heavy buckle requires a more powerful biasing means. However, in some instances it may be desirable to retract the buckle containing belt portion. The second belt portion merely lays where it is dropped. The unretracted belt portion frequently falls to the floor, under the seat, or out the door. If caught in the slide track of the seat adjusting apparatus, the belt webbing may be damaged and seriously weakened. These visible methods of belt damage and weakening are very real.

The webbing of seat belts can be weakened in other less noticeable manners also. The constant exposure of the webbing to light, moisture, and other ambient conditions reduces belt strength over a period of time, as studies have shown.

Because of these factors, a safety paradox occurs. That is, only one belt end can be retractable, for safety reasons, but the other unretractable belt end is thereby constantly exposed to damage and deterioration.

In addition to these safety factors, another disadvantage occurs with respect to the unretracted belt end, and that is simply the inconvenience of having this end in the proper position when needed. Stated summarily, the novel, protective, flattened, restraining-belt sheath assembly for a belt is extensible and contractible, telescopically, having a semi-rigid, self-supporting characteristic but capable of conformably flexing when extended. One end of the sheath has a special flap and orifice means to receive the belt anchor member, and the other end has a connector receiving pocket. The sheath employs a chamber to receive doubled back belt with sheath contraction.

It is an object of this invention to provide a seat belt device and a seat belt retainer, supporter, and protector that retains a seat belt portion in a compact, convenient position adjacent the side of the seat, enabling convenient access to and egress from the seat, allowing belt extension for connection, yet without a biasing retracting force on the belt. The novel device employs no springs, tension bands or elements, weighted retractors, or other mechanical biasing contrivance or apparatus to achieve the compact storage condition of the unit.

Another object of this invention is to provide a seat belt anchoring and protective sheath that receives a belt portion and its connecting element, and constantly retains the belt in convenient position, while yet allowing normal usage thereof for connection to the cooperative belt element on the opposite side of the seat.

Another object of this invention is to provide a seat belt stiffener sheath which enables the seat belt portion to actually be pushed back to a lowered position, i.e. depressed with respect to the seat, enables it to be pulled out to fully extended position for connection, retains the belt in either the extended or depressed condition, and yet conforms readily to the curvature of the body of the user.

The belt can be used effectively and safely in cooperation with a retractable belt portion, or in cooperation with another like device for the other belt portion. The device is useful for bucket style seats, and bench style seats, both front and back. It can assume several different specific configurations and constructions to suit the particular seat structure with which it is employed. The device can be mounted externally of a seat, enclosed within the structure of the seat, attached to the seat or other rigid elements, mounted within an arm rest construction on the seat, or otherwise.

These and several other objects of this invention will become apparent upon studying the following specification in conjunction with the drawings in which:

FIG. 4 is a plan view of the sheath and belt portion in FIG. 3;

FIG. 5 is a sectional view taken on plane V—V of FIG. 4 with the belt extended;

FIG. 6 is a sectional view like that in FIG. 5, with the elements of the sheath telescopically contracted so that the belt is doubled over inside the sheath;

FIG. 7 is a perspective view of a second form of the novel apparatus, as contracted;

FIG. 8 is a perspective view of the apparatus in FIG. 7, extended and with the outer part flexed to bodily curvature;

FIG. 9 is a sectional view of the second form of the invention;

FIG. 10 is a plan view of a third form of the invention, shown contracted;

FIG. 11 is a sectional view of the device of FIG. 10;

FIG. 12 is a perspective view of the third form of the device shown extended;

FIG. 13 is a fragmentary perspective view of the novel device with a slightly different form of buckle pocket;

FIG. 14 is a fragmentary perspective view of the novel device with a third type of buckle pocket;

FIG. 15 is a fragmentary perspective view of the novel device with a modified anchor plate pocket construction; and FIG. 16 is an elevational view of a fourth form of the novel device.

FIRST FORM

Figure 1:
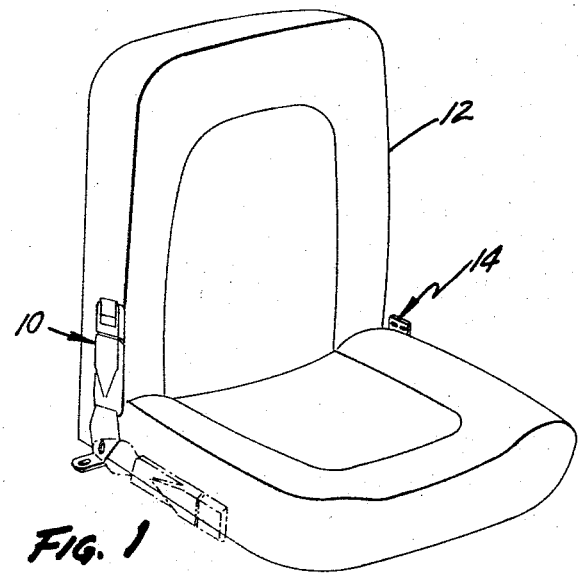
FIG. 1 is a perspective view of a typical bucket seat having the first form of the novel belt unit in combination therewith.

Referring now specifically to the drawings, FIGS. 1 through 6, the first form of the novel assembly 10 is shown with a typical bucket seat 12 and a retractable belt unit portion 14 on the opposite side of the seat. The retractable portion 14 includes a keeper latch plate on its upper end to interlock with the buckle portion 10, and is positioned in a conveniently accessible relationship to one side of seat 12 as by employing a retainer as shown in applicant's copending application entitled Retractor Housing, Ser. No. 388,242, filed Aug. 7, 1964.

Assembly 10 includes the major components of two telescopically interfiting sheath elements 16 and 18, containing seat belt 20 (FIG. 4) with its buckle 22 on one end and its anchor plate 24 on the other end. The seat belt is of conventional construction. Its anchor plate 24 includes an orifice 28 to be bolted to a typical anchor bracket 30 to the floor of the vehicle. The buckle 22 contains a typical pivotal cover 32 which can be pivoted upwardly to allow the buckle to receive the keeper plate of belt portion 14 in the manner shown in FIG. 2.

The two cooperative interfitting elements of the sheath are both of a semi-rigid material such as a molded polymer. This material is of a nature and thickness to enable the assembly to be self-supporting when in the contracted state, even if positioned in the upright position as in solid lines in FIG. 1. It may also assume a reclined position as in phantom lines in FIG. 1. When the unit is not in use, it will retain its convenient position immediately adjacent the side of the seat for convenient usage. Yet, the elements have sufficient flexibility to bend for conformation to bodily curvatures when attached around the user's upper legs. The flexibility of these elements can be varied by variance in the wall thickness, in the material employed, and the like. In practice it may be desirable to have one stiffer than the other or of the same stiffness.

Sheath element 16 closely interfits over and around the belt with just sufficient clearance to allow longitudinal slippage of the belt within the element, but to prevent buckling or doubling of the belt inside the element. Hence, it forms a confining jacket or sleeve preventing the belt from freely flexing or doubling. The sheath also protects the belt webbing from ambient conditions. It is moistureproof and dustproof, thereby preventing repeated contact of the webbing with rain, snow, saline solutions, dust, mud, and other conditions which promote deterioration. The webbing is also shielded from sunlight which is known to lessen strength of belt materials such as nylon over a time period.

Element 18 is broader and wider than element 16 to slidably receive the forward end of element 16 in telescopically interfitting fashion. The upper, outer end of element 18 has a buckle-receiving pocket. The pocket is preferably backed by an inwardly extending ridge 38 on the inner end, and an outer retention flange 40 on the outer end. This may be modified, however. The thick belt buckle 22 is received in this pocket, between ridge 38 and flange 40, preferably by a slight press fit, to be retained therein. Different types of buckles or connector elements may be encompassed by equivalent pockets. Thus, a hinged cover plate type buckle can be used, or push button buckles, or some other unit. If a pivotal cover is employed as in FIG. 5, a top portion of the pocket is cut away at 40 to allow the belt buckle cover 32 to be pivoted upwardly in a manner illustrated by the phantom lines. This allows the buckle to receive the keeper plate of belt portion 14 through the open front end of element 18. Alternatively, the cover plate may pivot the opposite direction, as shown by cover 32' on buckle 22' in the enclosure 18' of FIG. 13. Another illustrative example is the push button type buckle in FIG. 14, where the actuator button 33 protrudes through an opening in the top of the enclosure pocket of sheath 18" to allow insertion of the cooperative plate in the open end 19'. These are illustrative of the structure used for present buckle elements, but are not intended to be limiting since the novel principles apply to any number of possible connector means whether in the form of buckles or other. It will also be understood that the sheath concept, and the telescopic sheath concept may be employed with the second belt portion to which the keeper plate is attached. In that instance, the keeper plate must be sufficiently exposed to interconnect cooperatively.

The sheath has a close fit with the belt over its length except for a special belt storage cavity intermediate its ends. In the first form of the device shown, the belt receiving cavity 42 is intermediate the buckle-receiving end and the thinner end 18' of element 18. This cavity is of substantially greater depth than the thickness of belt 20 to enable the belt to be doubled back upon itself in the storage chamber. It assumes a generally undulated form, as for example of an S as illustrated in FIG. 6. It may assume the general position in FIG. 11 also. This doubling or folding occurs when the inner end of element 16 is slid into element 18 so that the inner edge of element 16 is adjacent the rear of buckle 22. The doubled back belt portion causes a belt length contraction by telescopic contraction of the interfitting sheath elements. In the usual vertical position of the belt, this causes depression of the outer sheath element to shorten the overall length thereof by moving it between the positions illustrated in FIGS. 1 and 2, or i.e., FIGS. 5 and 6.

Anchor plate 24 fits within the opposite end of element 16. This end is enlarged in width and configurated to receive the generally triangularly shaped anchor plate. It contains a special opening 29 on one side to allow initial insertion of plate 24.

Assembly of the novel unit with the belt portion is readily achieved. A typical way is as follows. Anchor plate 24 is not attached prior to insertion of the belt. Rather, the free end of the belt opposite the end containing buckle 22 is inserted through element 18 and then through element 16 and drawn out opening 29. The belt is then pulled through until the buckle is snapped into its pressed position in its receiving pocket in element 18. Then the two telescopic sheath elements are pushed together so that the rear end of belt 20 can be pulled out opening 29 to a considerable extent. The end of the belt is then inserted through the slot in the plate 24, and the anchor plate 24 is sewn on this end in conventional fashion. The two sheath elements are then extended with respect to each other, causing the anchor plate 24 to be pulled into opening 29 to the nested position shown in FIG. 4. Other methods of assembly could also be employed with various types of belt units.

Attachment of the unit to the vehicle is simple, for example, by mounting anchor plate 24 to a typical bracket 20 with a conventional bolt 31. This bolt passes through the lower end of sheath element 16 also, to retain it in position on the belt. The device is shown in two different positions in FIG. 1. It may be mounted with its lower fixed end further back with respect to the seat. Also, the bracket seat shown can be a bench type seat, front or back.

Figure 2:
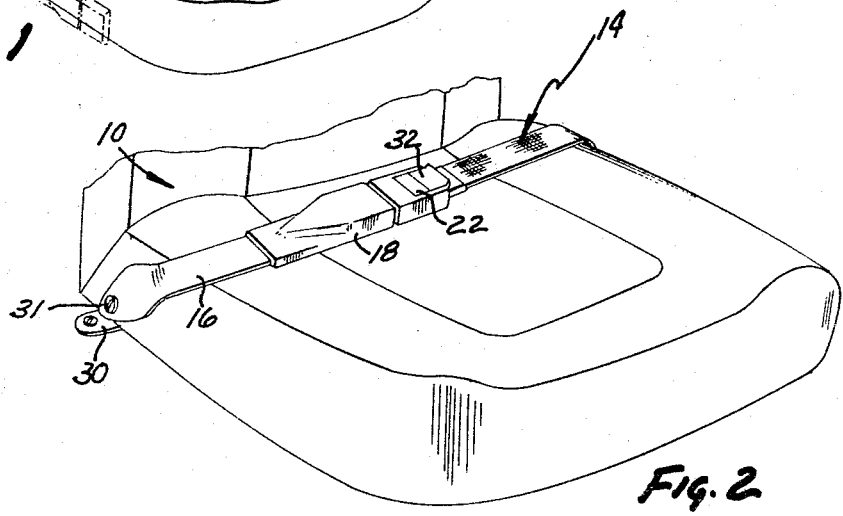
FIG. 2 is a perspective view of the combination in FIG. 1, showing the novel seat belt portion interconnected with the other seat belt portion.
Figure 3:
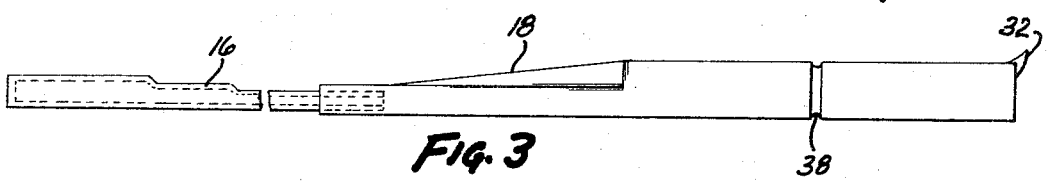
FIG. 3 is a side elevational view of the first form of the novel belt sheath.

The belt unit is sufficiently rigid when pushed together to its compressed state, to be self-supporting. It retains the belt and buckle in conveniently accessible relation to the seat. To use the unit, the upper end is merely grasped and pulled across the front of the person for interconnection with retractable portion 14 as shown in FIG. 2. As indicated previously, belt portion 14 need not be retractable. It may also be a sheath type unit like the mating portion 10. It may extend through a bench type seat also.

The sheath elements are of semi-rigid characteristics. They are of a material of sufficient stiffness that they can support their own weight and that of the belt. The elements must slide smoothly on one another. They also are resilient, to assure their linear orientation when released from a curved portion. Preferably, the elements are of a polymeric material. This is intended to include rubber and synthetic resins. The polymeric material forming the sheath element 16 bends and flexes readily with a large radius curvature to conform generally to the shape of the user. It will flex significantly when extended. The belt extends to its full length with the simple sliding extension of the sheath. There is no retracting bias applied to belt portion 20 tending to pull it back. All tension during use is applied to the belt itself and not to the sheath assembly. The unit presents comfortable conforming characteristics.

After use of the assembly, release of the belt buckle occurs by pivoting cover 32 upwardly in conventional fashion, or by shifting an alternative actuator, to release the keeper plate on belt portion 14. The belt 10 is then conveniently depressed to its contracted storage condition (FIG. 1) by pushing the buckle end of the belt assembly and sheath element 18 toward element 16 and bracket 30. Since element 16 closely retains the belt, and since the element has sufficient body to prevent buckling when pushed along its length, this results in a sliding telescopic contraction of the two sheath elements to shorten their overall length, thereby causing belt 22 to double over itself in the receiving pocket of element 18 immediately behind buckle 22. When the elements are telescopically interfitted in this manner, the self-supporting characteristics of the unit form a fairly rigid, upstanding construction capable of retaining the belt, buckle and sheath in the upright position.

The seat belt is completely protected by this assembly from moisture, dirt, mud, slush, saline solutions and light. It also retains the buckle in a protected relation.

SECOND FORM

In the second form of the invention shown in FIGS. 7 through 9, the complete assembly 110 includes a conventional belt element 111 having a buckle 112 at one end and an anchor plate 114 at the other end. These are all enclosed by the sheath which includes first and second sheath elements 116 and 118 that telescopically interfit with each other. In this particular form of the device, element 118 adjacent to and containing the connector buckle 112, is the smaller width, smaller breadth, and usually more flexible element. It has an internal passage just larger than the thickness and width of the seat belt to enable the belt to slightly slip therewithin, yet prevent the belt from buckling within this part of the sheath. This element 118 has an enlarged outer end pocket that receives buckle 112. The pocket is open at the top as shown in FIG. 9 to allow the buckle cover to pivot upwardly for connection of the engaging latch plate (not shown) through the open front end of the buckle. The pocket containing the buckle is open on the end also to enable the keeper plate to be inserted therethrough.

In this form of the device, the lower element 116 that retains the anchor plate 114 with its orifice 115 for mounting, has the enlarged slack-receiving portion 116'. This portion has a greater thickness than the remaining portions to enable the belt to be doubled back upon itself inside it as shown in FIG. 9, when the unit is in the contracted, shortened condition. The end of element 116 opposite the end that contains anchor plate 114 is slightly larger than the external dimensions of the end of element 118 opposite its buckle pocket, to enable a telescoping interfit therebetween.

This second form of the device is preferred since it can be adapted to a bodily conforming unit more readily. The thinner outer sheath sleeve can be made quite flexible and bendable to curve around the upper leg area of a person's body. It will readily bend transversely in a conforming curvature (see FIG. 8) when extended from element 116 into which it telescopically interfits. When fully extended, the sheath elements still interfit slightly, while the belt is completely unfolded in this condition to be at its maximum holding capacity. The holding stress is all applied to the belt, none to the sheath.

When the unit is contracted to its position shown in FIG. 7 and FIG. 9, the belt is doubled or folded back upon itself since receiving pocket 117 within enlarged portion 116' is of a depth substantially greater than three times the belt thickness plus the thickness of the inwardly protruding end of element 118. This receives the belt therefore when the elements are slid into each other to the most contracted position.

It will be noted that although element 118 is readily bendable into a conforming curvature under stress applied transverse to its long axis, it has sufficient body and rigidity to prevent buckling with an axial push along its length. Thus, by pushing on buckle 112 along the length of element 118, this element can be pushed into element 116 with a simple sliding telescopic fit, to contract the assembly into its compact, depressed storage position. When so contracted, the double walls of both elements together make the unit self-supporting and free-standing even when mounted only on its lower end in generally cantilever fashion. Thus, it has optimum characteristics of (1) body conformity when extended, (2) sufficient rigidity to enable pushing type contraction axially on the ends, and (3) self-standing capacity when contracted to a convenient storage position.

Placing the thicker belt-receiving pocket portion 116' on the lower element rather than the body contacting portion has another distinct advantage in addition to the more adaptable bending conformity to the person's upper leg area. Specifically, when the assembly is used in vehicles having a console housing between bucket seats, the element fits snugly between a seat and the console to constantly maintain its upright orientation rather than tending to pivot on its anchor bolt to drop down to the floor.

This second type of sheath performs its protective functions from ambient conditions like the first form of the sheath. Again, this form of the device need not be employed on the buckle mounting portion of the belt.

Further, also it is preferable to extend the sheath over the connector such as the buckle, and over the anchor plate, in some instances it may be desirable to terminate the sheath elements short of the connector and/or the anchor plate. The sheath could be secured to the belt in some suitable fashion such as by a rivet or any other means.

In any form of the novel device, the coloring thereof can be created to match vehicle decor, particularly if the sheath is of polymeric material. Either of these two element sheath devices could have stop means for preventing over-extension therebetween. Actually, in the specific units shown, the attachment of one end to the anchor plate and of the other end to the connector buckle prevents over-extension since the combined length of the two sheath elements is greater than the belt webbing length. If the sheath is not attached to the buckle and anchor plate, special stop means for doing this such as is specifically illustrated on the third form of the device may be needed.

This second form of the invention has particular advantages, although its basic principle of operation is essentially the same as that in the first form of the invention previously discussed.

THIRD FORM

There are instances where the unique sheath element that envelopes and stiffens the belt would be preferable if containing more than two telescopically interfitting elements. Thus, referring to FIGS. 10 through 12, the third form of the assembly 210 is shown to include three telescopically interfitting elements 212, 214, and 216. As can be understood, the three elements can contract to an over-all shorter length for a specific over-all extended length. When three elements are used, however, they must have interfitting ends which will prevent over-extension of any two elements with respect to the third one.

Thus, referring to FIGS. 10 through 12, it will be noted that the innermost element 216 not only has a buckle-receiving pocket to retain the connecting buckle 218 in its outer end, but on the opposite end has an enlargement 220. This enlargement has a greater dimensional outer thickness than the inner diameter of the narrowed end 222 of adjacent element 214, so that, when extended, these abut each other to prevent separation of the elements. Likewise, element 214 is tapered from end 222 to the opposite larger diameter end so that the larger diameter end 226 is greater in diameter than the breadth of the opening of element 212 adjacent the buckle because of the necked down end 228. Thus, these elements cannot depart from each other either. These ends abut each other when the elements are fully extended.

The rear end portion of the outermost element 212, i.e. that adjacent anchor plate 230, has belt slack-receiving pocket space 232. That is, this element has a longer enlarged space than the length of the two elements compacted into it so that there will be a sufficient pocket 232 adjacent the ends of the fully contracted other elements to retain the belt 236 in folded form.

The principle of operation of this third form of the device is substantially the same as the others. In other words, when an anchor bolt has been placed through orifice 250 of anchor plate 230 to anchor it to the vehicle, seat belt 236, secured to anchor plate 20 on one end and to buckle 218 on the other end, will be retained in an enclosed, protected, and stiffened condition. The entire assembly is sufficiently rigid to be self-supporting. The innermost element 216 closely fits adjacent the thickness of belt 236 to provide body to the belt and prevent it from buckling over when pushed axially along its length. Thus, by pushing on the buckle end of element 216 toward the anchor plate end of the belt, linearly of the longitudinal dimension of this assembly, the belt can be pushed along its length while being doubled over upon itself several times in the pocket area 232 of element 212 adjacent anchor plate 230. Full extension and full contraction are, therefore, achieved simply by a pull or push on the buckle.

The belt assembly can be changed greatly in its overall dimensions very readily without using any type of retractor mechanism. Yet the unit, when extended, can curve readily by bending in response to a force transverse to the longitudinal dimension thereof.

With any of the three described forms of the device, or variations thereof, the anchor plate pocket of the sheath may be completely enclosed and protected as shown in FIG. 15. To achieve this, the opening 29', used for insertion of the anchor plate, has a closure flap 25 which is severed from its integral sheath element 118' on all but one edge 119'. The flap has an orifice 121' for inserting the bolt which is passed through the anchor plate opening 115 (FIG. 8) and the opening 105 (FIG. 9) on the opposite side of the sleeve. With this construction, the anchor plate may be inserted by lifting the resilient flap as shown in phantom lines, and then is enclosed by lowering the resilient flap back to its position illustrated in solid lines in FIG. 15.

FOURTH FORM

Within the broader aspects of the novel concept, the telescopic action may be employed without completely enclosing the entire belt portion. This is particularly true on rear seats.

Referring to FIG. 16, the assembly 310 is shown mounted alongside a bench type seat 311, such as a rear seat. Most of the mechanism would thus be hidden alongside and slightly to the rear of the seat so that only the upper end would be visible. The assembly includes a belt which includes webbing 314, an anchor plate 316 and a buckle in pocket 318 of sheath element 320. The anchor plate 316 is secured to a suitable mount 322 normally out of sight. Sheath element 320 fits closely around part of the belt length. It telescopically slidably fits within a sleeve 326 of greater width and breadth. The sleeve has an anchor flange 328 or the equivalent attached to support structure such as panel 330. Full extension of the unit to the position shown in phantom lines pulls the webbing to its full length for attachment.

The unit has several of the advantages of the devices previously described. The belt can be placed in a compact condition or an extended one with a slight push or pull. It is conveniently positioned, and neatly retained. The exposed outer end of the belt is protected from ambient conditions by the device. The inner lower end will normally be hidden by the seat and upholstery. The elements are of semi-rigid, self-supporting, flexible, bodily comformable, resilient characteristics. The sleeve unit can be mounted in a variety of ways, on different type seats. Also, the belt can be mounted in several different ways, behind the seat, on the floor, in an arm rest, etc.

With all of these forms of the device, the force necessary to extend the belt to full extension is very small, less than 1 pound pull, and therefore, far less than retractors which usually have a 2–3 pound pull. Hence, a self-adjusting retractor belt portion used in combination with this, for example, will assuredly extend the compacted belt portion its full extent by sleeve telescopic extension.

It is conceivable that several various other structural changes within the concepts presented may be made in the embodiments of the device illustrated. The inventor has provided a unique concept for handling, retaining, and protecting seat belt portions. It has particular advantage for usage with the buckle end of a seat belt, but can also be used with the keeper plate end or any other connector in an advantageous manner. Various other variations of the structure could be conceived, while incorporating the concept presented. Hence, the invention is intended to be limited only by the scope of the appended claims and the reasonably equivalent structures to those defined therein.

I claim:

1. A restraining belt sheath comprising: an elongated, hollow, stiffening, belt-receiving sheath having means for locating said sheath on the belt; said sheath being pullingly extensible to length, and to thereby lengthen the belt, pushingly depressible to shorten, and to thereby shorten the belt, and constructed in a manner enabling belt folding with sheath shortening, for compact belt storage.

2. A restraining belt sheath comprising: an elongated, hollow, stiffening, belt-receiving sheath having means at one end for fixed attachment to the vehicle and means at the other end for mounting a belt connector; said sheath being pullingly extensible to lengthen, and to thereby lengthen the belt, pushingly depressible to shorten, and to thereby shorten the belt, and having means enabling belt folding with sheath shortening, for compact belt storage.

3. A restraining belt sheath comprising: an elongated, hollow, stiffening, belt-receiving sheath having means at one end for fixed attachment, and means at the other end for attachment at a belt connector; said sheath being pullingly extensible along its length to lengthen, to thereby lengthen the belt, having semi-rigidity to be pushingly compressible by compression force along its length, to shorten and to thereby shorten the belt, and said sheath being semi-rigid to be generally self-supporting, and flexible under bending stress to conform to body curvature.

4. A restraining belt extender-contractor comprising: a plurality of elongated, flattened sleeves telescopically, slidably interfitted with each other; at least one of said sleeves having a central passage slightly larger than a normal vehicle restraining belt to slidably receive the belt but prevent uncontrolled belt buckling therein with sliding contraction of said sheath; said sleeves having sufficient rigidity to allow sliding contraction of said sheath by pushing them into each other, and at least said one sleeve being bendable to conform to bodily curvature.

5. A restraining belt retaining assembly for a buckle-end belt, comprising: a plurality of members including a first housing member having an end pocket to receive the buckle of a restraining belt, and an elongated belt encompassing sheath portion adjacent to and extending from said pocket, and a second housing member having attachment means for affixing it; said second member being slidably engaged with said first member in telescopic fashion to enable sliding extension and contraction therebetween with pulling and pushing on said first housing member, to thereby enable the belt and buckle to be pushed to a convenient contracted position, and pulled to extended condition for connection; and said housing members being semi-rigid, self-supporting members causing projection thereof to a convenient position for grasping when contracted, and having limited flexibility to conform to body curvatures when extended.

6. A telescopic housing assembly for a flexible restraining belt, comprising: at least two semi-rigid, self-supporting members having ends telescopically interengaged with each other, one element inside the second element; said members being slidably extensible and contractible with telescopic intermovement to change the over-all length of the housing assembly; said members being of generally flattened configuration to confine a belt therein and provide stiffening support thereto; and belt fold receiving means in said second element adjacent the end of said one element to receive excess belt in doubled back form when said members are telescopically interengaged to a contracted state.

7. A restraining belt retainer comprising: an elongated belt stiffener jacket of semi-rigid construction to be self-supporting, and having sufficient flexibility to conform to body curvature; said jacket having a narrow slot therethrough to closely encompass a restraining belt and remain in a relatively fixed position thereon, and to provide compressive support preventing the belt from uncontrollable doubling when the combined belt and jacket are pushed to a depressed position; and a self-supporting receiving member having a mouth to slidably receive the end of said jacket and the adjacent belt portion and allow movement of said jacket and belt between a depressed position and extended position, and having mounting means for fixedly securing said member.

8. A restraining belt unit comprising: a safety belt having an anchor element on one end and a connector on the second end with an actuator; an elongated flattened housing means confining said belt, configurated on one end to form an anchor element pocket to encompass said anchor element, and having a connector receiving pocket on the second end; said belt, element and connector being encompassed within said housing means, forming a self-supporting unit; said connector receiving pocket having an opening in one wall, allowing its actuator to be exposed through the opening, and having an open end to receive a cooperative connector for said enclosed connector.

9. The sheath in claim 10 wherein said pocket end includes a stop surface to limit penetration of the connector therein; and one side wall of said pocket end is open to allow connector actuator access.

10. A protective sheath and restraining belt assembly comprising: a restraining belt having a connector on an end; an elongated sheath means having a flattened configuration generally rectangular in cross section, and closely receiving said restraining belt; said sheath having an enlarged pocket end receiving said belt connector; said pocket end having portions interfitting with said connector to retain said connector therein when in use as well as when not in use; said pocket end having opening means to allow connector usage without removal of said connector from said pocket end; and said sheath being of self-supporting, semi-rigid, bendable characteristics to lend self-supporting body to said belt and connector, and to flex to a curved conformation on a person's body.

11. A restraining belt housing comprising: at least two belt jacket members of elongated generally flattened configuration; said members being sufficiently rigid and configurated to be slidably, telescopically interfittable one within the other; each member having a passage to closely jacket a part of a restraining belt portion to stiffen the belt part into a generally self-supporting condition and to also prevent doubling of the belt therein; and one member having means adjacent the inner end of said member allowing belt doubling with telescopic contraction of said members.

12. A protective sheath for a restraining belt element comprising: an elongated sheath means having a flattened configuration generally rectangular in cross section, and adapted to closely receive a restraining belt; said sheath having a pocket on one end for receiving and retaining an anchor plate; said pocket having an opening in its side of substantial size to receive an anchor plate into the sheath; a pivotal flap over said opening, integral along one edge with said sheath, to close said opening after insertion of the plate; and orifice means through said flap and the opposite side of said pocket to receive a connector for said anchor plate.

13. An extensible-contractible restraining belt housing, comprising: at least two semi-rigid, self-supporting, belt jacket members of elongated, generally flattened configuration with passages to closely fit around a restraining belt; one member having a connector receiving pocket in one end thereof; the other member slidably telescopically interfitting with the second end of said one member, and one of said members having an enlarged chamber between its ends forming receiving space for doubled back belt with telescopic contraction of said housing.

14. A restraining belt sheath assembly comprising: a plurality of at least three, elongated, hollow sheath elements telescopically interfitted with each other in end-to-end fashion; the element on one end including restraining belt buckle retention means, and the element on the other end including anchor plate cooperative means; the intermediate element having extension limiting means on both ends cooperatively engaged with the adjacent elements to prevent separation thereof with extension of said sheath along the belt; said sheath being telescopically contractible to a self-supporting condition by a push along its longitudinal dimension, and being extensible to a curvature conformable, bendable condition by a pull along its dimension; and belt slack receiving means to receive doubled belt with sheath contraction.

15. The assembly in claim 14 wherein said slack receiving means is a pocket forming area on one of said end elements.

16. The assembly in claim 15 wherein said one end element is the one having means for retaining the anchor plate.

17. The assembly in claim 14 wherein said elements are semi-rigid, self-supporting, bendable, bodily conformable, and resilient.

References Cited by the Examiner

UNITED STATES PATENTS

| | | | |
|---|---|---|---|
| 1,994,886 | 3/1935 | Doane | 174—69 X |
| 2,830,655 | 4/1958 | Lalande | 280—150 |
| 3,126,228 | 3/1964 | Greene et al. | 297—385 |
| 3,171,688 | 3/1965 | Nicholas | 297—388 |
| 3,175,862 | 3/1965 | Robbins | 297—385 |

References Cited by the Applicant

UNITED STATES PATENTS 3,046,056   7/1962   Greene et al.

FRANK B. SHERRY, *Primary Examiner.*

CASMIR A. NUNBERG, *Examiner.*